(12) United States Patent
Shinojima et al.

(10) Patent No.: US 10,142,877 B2
(45) Date of Patent: Nov. 27, 2018

(54) MANAGEMENT DEVICE, COMMUNICATION SYSTEM, AND COMMUNICATION CONTROL METHOD

(71) Applicant: FUJITSU LIMITED, Kawasaki-shi, Kanagawa (JP)

(72) Inventors: Ryota Shinojima, Kawasaki (JP); Masashi Ohno, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 205 days.

(21) Appl. No.: 14/861,007

(22) Filed: Sep. 22, 2015

(65) Prior Publication Data

US 2016/0143023 A1    May 19, 2016

(30) Foreign Application Priority Data

Nov. 18, 2014  (JP) .................................. 2014-234038

(51) Int. Cl.
| | | |
|---|---|---|
| *H04W 72/04* | (2009.01) | |
| *H04W 28/02* | (2009.01) | |
| *H04W 76/36* | (2018.01) | |
| *H04W 4/70* | (2018.01) | |

(52) U.S. Cl.
CPC ......... *H04W 28/0215* (2013.01); *H04W 4/70* (2018.02); *H04W 28/0289* (2013.01); *H04W 76/36* (2018.02)

(58) Field of Classification Search
None
See application file for complete search history.

(56) References Cited

U.S. PATENT DOCUMENTS

| | | | |
|---|---|---|---|
| 2005/0262266 A1* | 11/2005 | Wiberg | H04L 47/10 709/238 |
| 2006/0109816 A1 | 5/2006 | Imaeda | |
| 2012/0155257 A1 | 6/2012 | Tiwari | |
| 2012/0307774 A1* | 12/2012 | Zhao | H04W 74/08 370/329 |
| 2013/0203450 A1 | 8/2013 | Mochizuki et al. | |
| 2015/0195202 A1* | 7/2015 | Ogura | H04M 3/00 370/236 |
| 2016/0050671 A1* | 2/2016 | Yu | H04W 76/04 455/450 |

(Continued)

FOREIGN PATENT DOCUMENTS

| | | |
|---|---|---|
| JP | 2005-86694 | 3/2005 |
| JP | 2006-148580 | 6/2006 |

(Continued)

OTHER PUBLICATIONS

JPOA—Japanese Office Action dated May 8, 2018 for Japanese Patent Application No. 2014-234038, with English translation.

*Primary Examiner* — Mansour Oveissi
*Assistant Examiner* — David M Oveissi
(74) *Attorney, Agent, or Firm* — Fujitsu Patent Center

(57) ABSTRACT

A management device includes a communication controller that determines whether or not to release a communication resource reserved for a stationary terminal according to whether or not congestion is occurring in a core network at termination of communication of the stationary terminal, and a network interface unit that transmits a result of the determination by the communication controller to a base station.

5 Claims, 14 Drawing Sheets

(56) References Cited

U.S. PATENT DOCUMENTS

| | | | |
|---|---|---|---|
| 2016/0066207 A1* | 3/2016 | Pandey | H04W 4/70 370/230 |
| 2016/0198360 A1* | 7/2016 | Smith | H04W 28/0289 370/237 |
| 2016/0212653 A1* | 7/2016 | Wang | A61B 10/0051 |

FOREIGN PATENT DOCUMENTS

| | | |
|---|---|---|
| JP | 2007-166593 | 6/2007 |
| JP | 2012-134977 | 7/2012 |
| WO | 2012/043524 A1 | 4/2012 |

\* cited by examiner

FIG.5

| STATIONARY TERMINAL ID | COMMUNI-CATION PERMITTED TIME | CELL | COMMUNICATION PERMITTED AREA (LATITUDE, LONGITUDE, RADIUS) | DATA VOLUME | RT PROPERTY | DESTINATION SERVER ID |
|---|---|---|---|---|---|---|
| 1111 | 8:00 TO 9:00, 10:00 TO 11:00, 14:00 TO 15:00 | CELL A | (x1, y1, r1) | 100M BYTES | NON-RT | aaaa |
| 1212 | 6:00 TO 22:00 | CELL A | (x2, y2, r2) | 100M BYTES | RT | abab |

FIG.6

| TERMINAL ID | DATE | START TIME | END TIME | CELL | POSITION (LATITUDE, LONGITUDE) | DATA AMOUNT |
|---|---|---|---|---|---|---|
| 1111 | 2014/10/25 | 8:00 | 8:10 | A | (x1, y1) | 10M BYTES |
| | 2014/10/25 | 10:30 | 10:40 | A | (x1, y1) | 10M BYTES |
| | 2014/10/25 | 14:15 | 14:25 | A | (x1, y1) | 10M BYTES |
| 5555 | 2014/10/25 | 8:00 | 8:10 | A | (x3, y3) | 100M BYTES |
| | 2014/10/25 | 11:00 | 11:15 | A | (x4, y4) | 200M BYTES |
| | 2014/10/25 | 16:30 | 16:40 | A | (x5, y5) | 300M BYTES |

FIG.8

| TERMINAL ID | POSITION INFORMATION | AVAILABLE RESOURCE AMOUNT |
|---|---|---|

FIG.9

| CONNECTION RESULT |
|---|

FIG.13

| TERMINAL ID | DATA VOLUME | AVAILABLE RESOURCE AMOUNT |
|---|---|---|

FIG.14

| CONNECTION METHOD | AO FLAG |
|---|---|

MANAGEMENT DEVICE, COMMUNICATION SYSTEM, AND COMMUNICATION CONTROL METHOD

CROSS-REFERENCE TO RELATED APPLICATION

This application is based upon and claims the benefit of priority of the prior Japanese Patent Application No. 2014-234038, filed on Nov. 18, 2014, the entire contents of which are incorporated herein by reference.

FIELD

The embodiments discussed herein are related to a management device, a communication system, and a communication control method.

BACKGROUND

In communication systems including base stations and user terminals (user equipment: UE; hereinafter may also be referred to simply as "terminals"), machine type communication (MTC) terminals have recently attracted attention as new terminals. Examples of the MTC terminals include a smart meter that is an electricity meter having a radio communication function, and a vending machine having a radio communication function. A smart meter having a radio communication function transmits data of measured electricity usage and the like to a server via a base station and a core network, for example. A vending machine having a radio communication function transmits sales information, information on stock in the vending machine, and the like to a server via a base station and a core network, for example.

Additional introduction of MTC terminals into a communication system including conventional terminals such as cellular phones, smart phones, and tablet terminals has also been considered.

Examples of related-art are described in Japanese Laid-open Patent Publication No. 2005-086694, in Japanese Laid-open Patent Publication No. 2006-148580, and in Japanese Laid-open Patent Publication No. 2007-166593.

In recent years, however, with increasing use of smart phones, tablet terminals and the like capable of transmitting and receiving a great deal of data of a variety of types, the circumstances are such that the communication traffic in communication systems is rapidly increasing. If MTC terminals are additionally introduced under such circumstances, the communication traffic will further increase, which increases the load on a core network. Since the communication resources in a core network are limited, it is expected that the increase in the communication traffic resulting from introduction of MTC terminals will have an adverse effect on communication of existing terminals.

SUMMARY

According to an aspect of an embodiment, a management device includes a communication controller that determines whether or not to release a communication resource reserved for a stationary terminal according to whether or not congestion is occurring in a core network at termination of communication of the stationary terminal, and a network interface unit that transmits a result of the determination by the communication controller to a base station.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a table illustrating an example of a stationary terminal management table according to the first embodiment;

FIG. 6 is a table illustrating an example of a communication condition management table according to the first embodiment;

FIG. 8 is a diagram illustrating an example of a message 1 according to the first embodiment;

FIG. 9 is a diagram illustrating an example of a message 2 according to the first embodiment;

FIG. 13 is a diagram illustrating an example of a message 3 according to the first embodiment;

FIG. 14 is a diagram illustrating an example of a message 4 according to the first embodiment;

DESCRIPTION OF EMBODIMENTS

Preferred embodiments of the present invention will be explained with reference to accompanying drawings. Note that the management device, the communication system, and the communication control method disclosed herein are not limited to the embodiment. In the embodiment, components having the same functions and steps of the same processes

[a] First Embodiment

Configuration of Communication System

Figure 1:
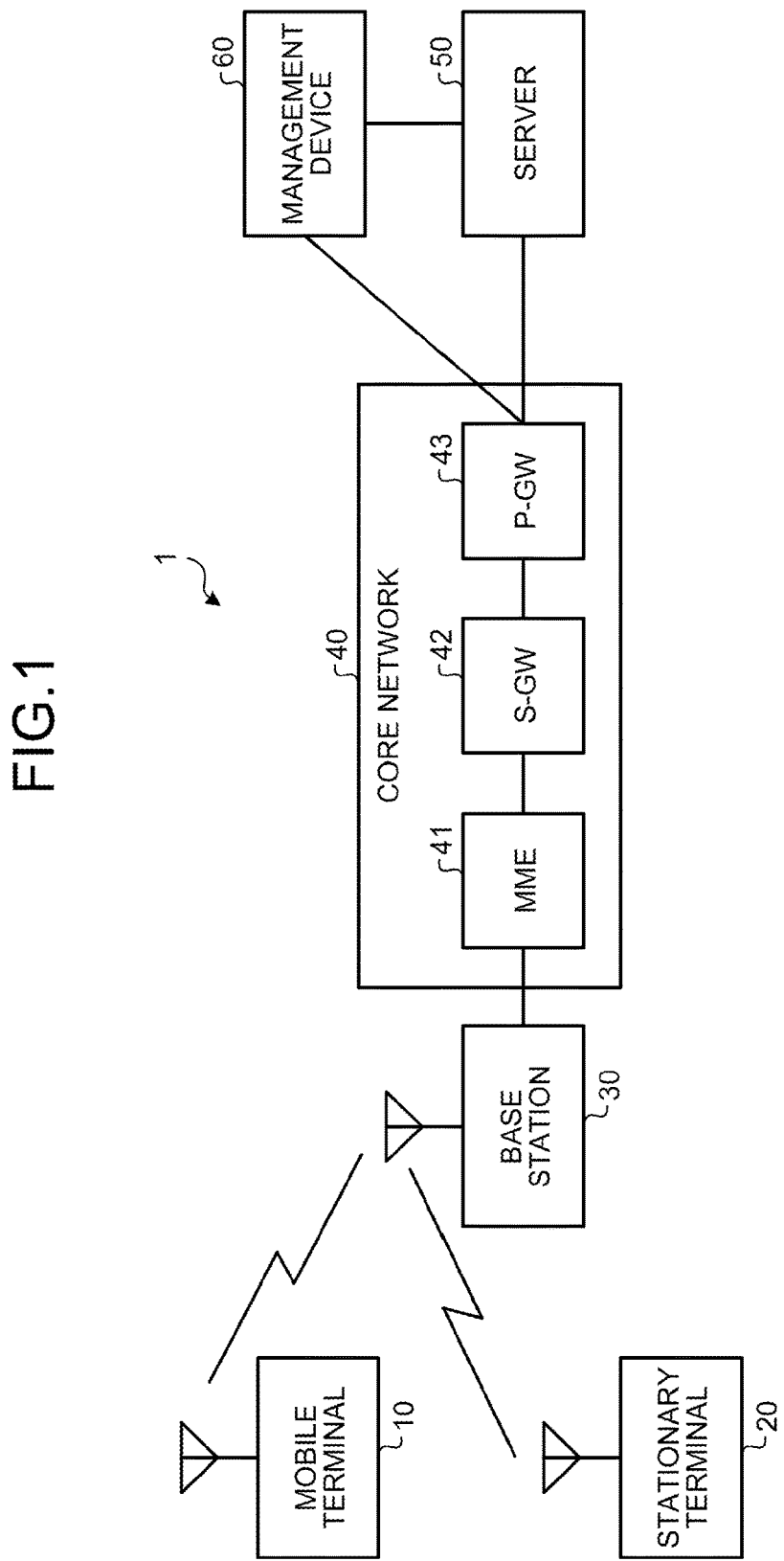
FIG. 1 is a diagram illustrating an example of a communication system according to a first embodiment.

FIG. 1 is a diagram illustrating an example of a communication system according to a first embodiment. In FIG. 1, a communication system 1 includes a mobile terminal 10, a stationary terminal 20, a base station 30, a core network 40, a server 50, and a management device 60. The core network 40 has a mobility management entity (MME) 41, a serving-gateway (S-GW) 42, and a packet data network gateway (P-GW) 43. The stationary terminal 20 is connected to the server 50, with which the stationary terminal 20 communicates, via the base station 30 and the core network 40. The stationary terminal 20 and the base station 30 are connected with each other via a wireless link, and the base station 30 and the server 50 are connected with each other via a wired link. Thus, when the stationary terminal 20 is to communicate with the server 50, some of all the radio resources of the base station 30 are reserved for the stationary terminal 20 and some of all the wired resources of the core network 40 are reserved for the stationary terminal 20. Thus, when the stationary terminal 20 is to communicate with the server 50, some of all the communication resources in the communication system 1 are reserved for the stationary terminal 20.

Note that a "mobile terminal" refers to a conventional general terminal that is mobile such as a cellular phone, a smart phone, or a tablet terminal. In contrast, a "stationary terminal" is a terminal that is not mobile such as a smart meter, and correspond to a MTC terminal. A "stationary terminal" is, in other words, a "non-mobile terminal." The mobile terminal 10 and the stationary terminal 20 are present in the same cell covered by the base station 30, and communicate with the base station 30 according to the same communication method.

Configuration of Stationary Terminal

Figure 2:
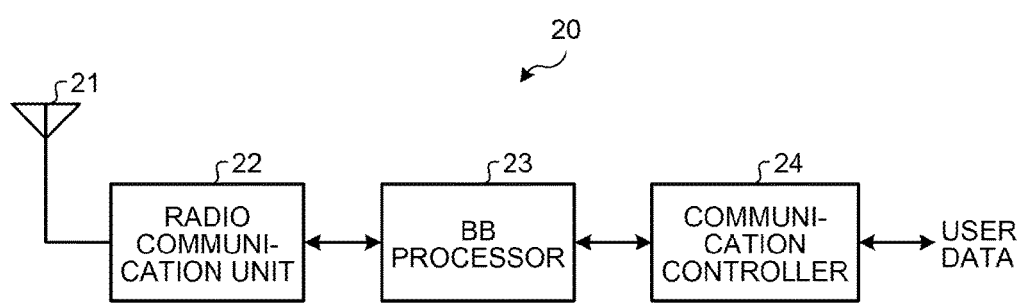
FIG. 2 is a functional block diagram illustrating an example of a stationary terminal according to the first embodiment.

FIG. 2 is a functional block diagram illustrating an example of the stationary terminal according to the first embodiment. In FIG. 2, the stationary terminal 20 includes a communication controller 24, a BB (baseband) processor 23, a radio communication unit 22, and an antenna 21.

The communication controller 24 generates various control messages and outputs the generated control messages to the BB processor 23. The communication controller 24 also generate a user data packet from user data addressed to the server 50 and outputs the generated user data packet to the BB processor 23. The communication controller 24 also acquires user data from a user data packet input from the BB processor 23.

The BB processor 23 performs BB processing such as encoding and modulation on a control message and a user data packet input from the communication controller 24 to generate a baseband signal to be transmitted, and outputs the generated signal to be transmitted to the radio communication unit 22. The BB processor 23 also performs BB processing such as demodulation and decoding on a received baseband signal input from the radio communication unit 22 to obtain a control message and a user data packets, and outputs the control message and the user data packet to the communication controller 24.

The radio communication unit 22 performs digital-to-analog conversion, up-conversion, and the like on a baseband signal to be transmitted input from the BB processor 23, and transmits the up-converted signal to be transmitted to the base station 30 via the antenna 21. The radio communication unit 22 also performs down-conversion, analog-to-digital conversion, and the like on a received signal received via the antenna 21 to obtain a received baseband signal, and outputs the received baseband signal to the BB processor 23.

Configuration of Base Station

Figure 3:
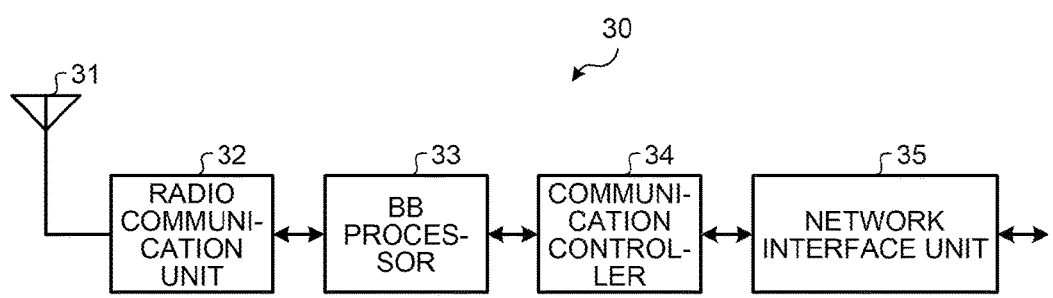
FIG. 3 is a functional block diagram illustrating an example of a base station according to the first embodiment.

FIG. 3 is a functional block diagram illustrating an example of the base station according to the first embodiment. In FIG. 3, the base station 30 includes a network interface unit 35, a communication controller 34, a BB processor 33, a radio communication unit 32, and an antenna 31.

The network interface unit 35 is connected with the core network 40. The network interface unit 35 transmits a user data packet and a control message input from the communication controller 34 to the core network 40, and outputs a user data packet and a control message received from the core network 40 to the communication controller 34.

The communication controller 34 generates various control messages and outputs the generated control messages to the BB processor 33 or the network interface unit 35. The communication controller 34 also outputs a user data packet and a control message input from the BB processor 33 to the network interface unit 35, and outputs a user data packet and a control message input from the network interface unit 35 to the BB processor 33.

The BB processor 33 performs BB processing such as encoding and modulation on a control message and a user data packet input from the communication controller 34 to generate a baseband signal to be transmitted, and outputs the generated signal to be transmitted to the radio communication unit 32. The BB processor 33 also performs BB processing such as demodulation and decoding on a received baseband signal input from the radio communication unit 32 to obtain a control message and a user data packet, and outputs the control message and the user data packet to the communication controller 34.

The radio communication unit 32 performs digital-to-analog conversion, up-conversion, and the like on a baseband signal to be transmitted input from the BB processor 33, and transmits the up-converted signal to be transmitted to the stationary terminal 20 via the antenna 31. The radio communication unit 32 also performs down-conversion, analog-to-digital conversion, and the like on a received signal received via the antenna 31 to obtain a received baseband signal, and outputs the received baseband signal to the BB processor 33.

Configuration of Management Device

Figure 4:
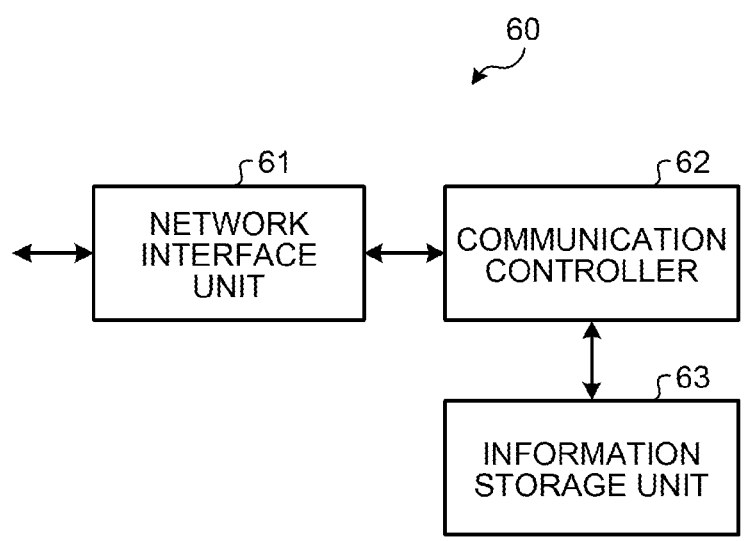
FIG. 4 is a functional block diagram illustrating an example of a management device according to the first embodiment.

FIG. 4 is a functional block diagram illustrating an example of the management device according to the first embodiment. In FIG. 4, the management device 60 includes a network interface unit 61, a communication controller 62, and an information storage unit 63.

The network interface unit 61 is connected with the core network 40. The network interface unit 61 transmits a control message input from the communication controller 62 to the core network 40, and outputs a control message received from the core network 40 to the communication controller 62.

The communication controller 62 generates various control messages and outputs the generated control messages to the network interface unit 61. In this process, the communication controller 62 generates control messages on the basis of various information data stored in the information storage unit 63. For example, the information storage unit 63 stores a "stationary terminal management table" and a "communication condition management table." FIG. 5 is a table illustrating an example of the stationary terminal management table according to the first embodiment, and FIG. 6 is a table illustrating an example of the communication condition management table according to the first embodiment.

In FIG. 5, the stationary terminal management table contains entries of "stationary terminal ID," "communication permitted time," "cell," "communication permitted area," "data volume," "RT (real-time) property," and "destination server ID." These entries are registered in advance by a provider or the like of the communication system 1. The "stationary terminal ID" is an identifier uniquely identifying a stationary terminal 20. The "communication permitted time" indicates a time period during which the stationary terminal 20 is permitted to communicate. The "cell" indicates a cell in which the stationary terminal 20 is installed. The "communication permitted area" indicates an area of a predetermined radius from a center position (in latitude and longitude) at which the stationary terminal 20 is initially installed, and the stationary terminal 20 is permitted to communicate only when the stationary terminal 20 is present in this area. The "data volume" indicates a maximum data volume permitted in one communication. The "RT property" indicates whether or not data transmitted from the stationary terminal 20 have the RT property. The "destination server ID" is an identifier uniquely identifying a server 50 with which the stationary terminal 20 communicates.

For example, in the example illustrated in FIG. 5, three time zones of from 8:00 to 9:00, from 10:00 to 11:00, and from 14:00 to 15:00 are registered as the communication permitted time for a stationary terminal 20 having an ID "1111." In addition, the installation position of the stationary terminal 20 with the ID "1111" is at a position of at a latitude x1 and a longitude y1 within a cell A, and the stationary terminal 20 with the ID "1111" is permitted to communicate only in an area with a radius r1 from the position at the latitude x1 and the longitude y1. Furthermore, the maximum data volume permitted per one communication of the stationary terminal 20 with the ID "1111" is 100M bytes, data transmitted from the stationary terminal 20 with the ID "1111" do not have the RT property, and the data are transmitted to a server 50 with an ID "aaaa."

As described above, the stationary terminal management table illustrated in FIG. 5 has registered therein information on the stationary terminal 20 but does not have registered therein information on the mobile terminal 10.

In FIG. 6, the communication condition management table contains entries of "terminal ID," "date," "start time," "end time," "cell," "position," and "data volume." These entries are recorded by the communication controller 62 each time the mobile terminal 10 or the stationary terminal 20 performs communication. The "terminal ID" is an identifier uniquely identifying a mobile terminal 10 or a stationary terminal 20. The "date" indicates the date on which communication is performed. The "start time" indicates the start time of communication and the "end time" indicates the end time of communication. The "cell" indicates a cell in which communication is performed. The "position" indicates in latitude and longitude a position of a mobile terminal 10 or a stationary terminal 20 that has performed communication at the time point when the communication is started. The "data volume" indicates the volume of data transmitted and received in each communication.

For example, a terminal with the ID "1111" in the communication condition management table of FIG. 6 is also registered in the stationary terminal management table of FIG. 5, and is thus the stationary terminal 20. A terminal with an ID "5555" in the communication condition management table of FIG. 6 is not registered in the stationary terminal management table of FIG. 5, and is thus a mobile terminal 10. Thus, the position of the terminal with the ID "5555" at the start of communication has changed at each communication: (x3, y3)→(x4, y4)→(x5, y5).

Processing Sequence of Communication System (at Call Setup)

Figure 7:
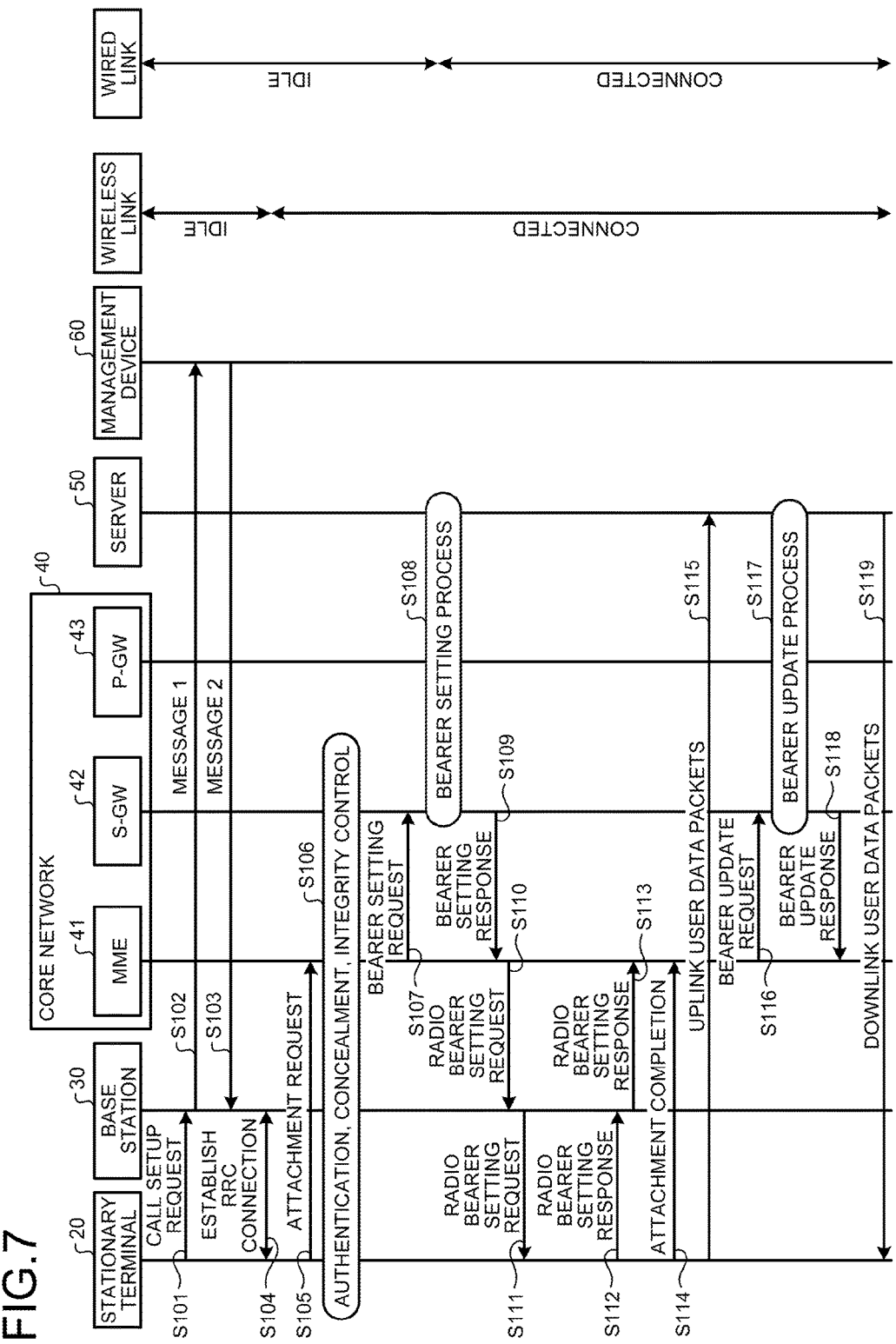
FIG. 7 is a chart illustrating an example of a processing sequence of the communication system according to the first embodiment.

FIG. 7 is a chart illustrating an example of a processing sequence of the communication system according to the first embodiment. FIG. 7 illustrates a processing sequence for call setup.

First, the communication controller 24 of the stationary terminal 20 transmits a call setup request to the base station 30 (step S101). The call setup request contains the terminal ID of the stationary terminal 20, and position information indicating a current position of the stationary terminal 20 in latitude and longitude. The current position of the stationary terminal 20 is acquired by the stationary terminal 20 by means of a GPS (global positioning system) function of the stationary terminal 20, for example.

In the base station 30 in receipt of the call setup request, the communication controller 34 generates a "message 1" and transmits the generated message 1 to the management device 60 (step S102).

FIG. 8 is a diagram illustrating an example of the message 1 according to the first embodiment. In FIG. 8, the message 1 contains entries of "terminal ID," "position information," and "available resource amount," and the contents of the entries are set by the communication controller 34. Specifically, in the "terminal ID," a terminal ID contained in the call setup request is set. In the "position information," position information (latitude, longitude) contained in the call setup request is set. In the "available resource amount," information indicating the amount of available resources among all the radio resources in the base station 30 is set. Examples of the information indicating the available resource amount include the number of remaining terminals that can be currently contained in the base station 30, the number of remaining channels that can currently be allocated to terminals, and the remaining transmission power with respect to the total transmission power that the base station 30 is permitted to use.

In the management device 60 in receipt of the message 1, the communication controller 62 determines whether or not to connect the stationary terminal 20, generates a "message 2" indicating the determination result, and transmits the generated message 2 to the base station 30 (step S103).

Figure 10:
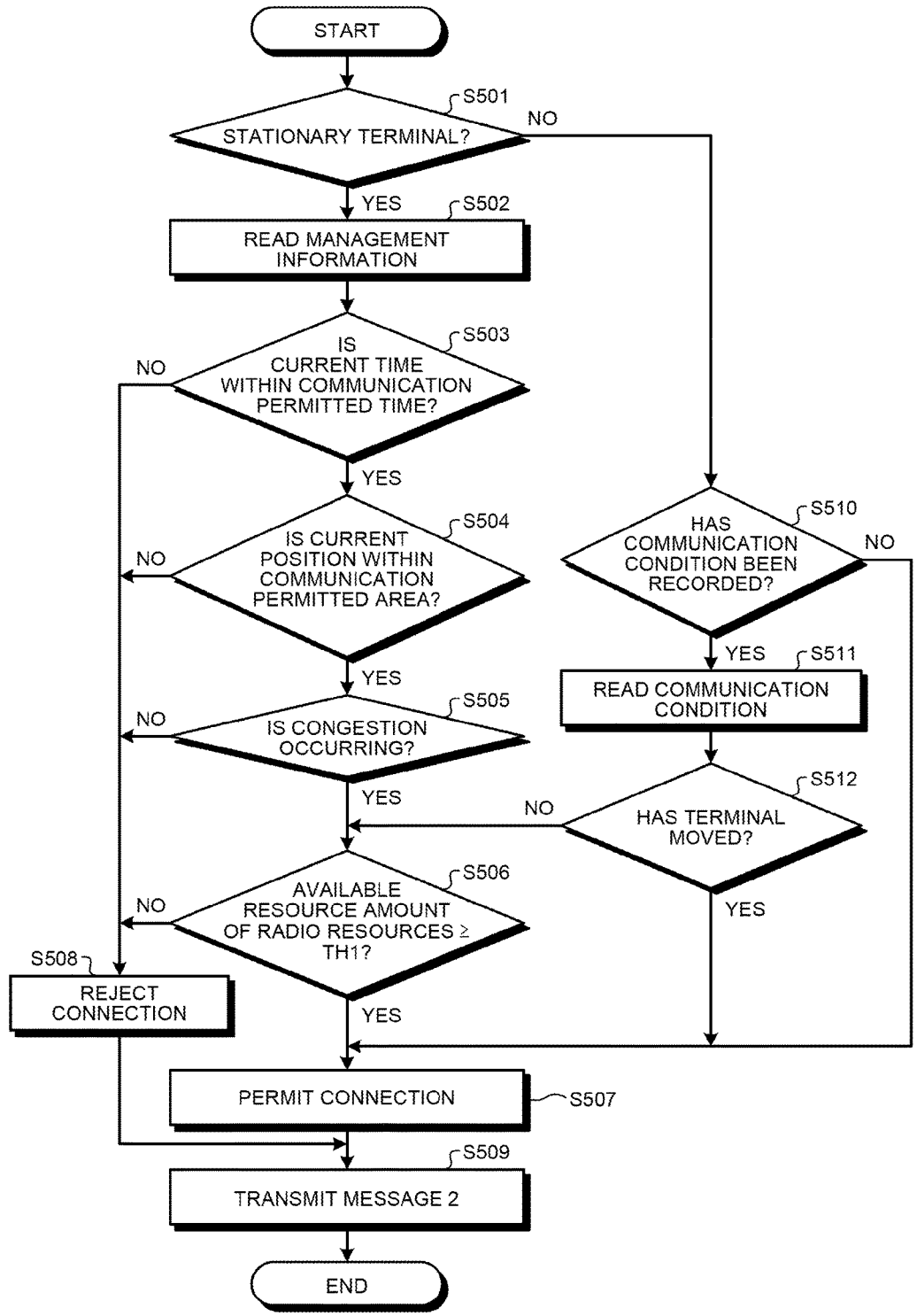
FIG. 10 is a flowchart for explanation of processing performed by the management device according to the first embodiment.

FIG. 9 is a diagram illustrating an example of the message 2 according to the first embodiment. In FIG. 9, the message 2 contains an entry of "connection result," the content of which is set by the communication controller 62. In the "connection result," the result of determination on whether or not to connect the stationary terminal 20 is set. The result of determination on whether or not to connect is any one of three results: "permit connection," "reject connection," and "interrupt connection," for example. The determination on whether or not to connect performed by the communication controller 62 is as follows. FIG. 10 is a flowchart for explanation of processing performed by the management device according to the first embodiment. The flowchart illustrated in FIG. 10 is started when the message 1 is received by the management device 60 and input to the communication controller 62.

In FIG. 10, the communication controller 62 first determines whether or not a terminal having a terminal ID set in the message 1 is a stationary terminal (step S501). Specifically, the communication controller 62 searches the stationary terminal management table on the basis of the terminal ID set in the message 1, and performs the determination of step S501 according to whether or not the terminal corresponding to the terminal ID set in the message 1 is registered in the stationary terminal management table. If the terminal corresponding to the terminal ID set in the message 1 is registered in the stationary terminal management table, the communication controller 62 determines that the terminal having the terminal ID set in the message 1 is a stationary terminal 20 (step S501: Yes). If the terminal corresponding to the terminal ID set in the message 1 is not registered in the stationary terminal management table, the communication controller 62 determines that the terminal having the terminal ID set in the message 1 is not a stationary terminal 20, that is, the terminal is a mobile terminal 10 (step S501: No).

If it is determined "Yes" in step S501, the communication controller 62 reads management information associated with the terminal ID set in the message 1 from the stationary terminal management table (step S502). When the terminal ID set in the message 1 is "1111," the communication controller 62 reads management information including "8:00 to 9:00, 10:00 to 11:00, 14:00 to 15:00" as the communication permitted time, "cell A" as the cell, "(x1, y1, r1)" as the communication permitted area, "100M bytes" as the data volume, "non-RT" as the RT property, and "aaaa" as the destination server ID from the stationary terminal management table.

Subsequently, the communication controller 62 determines whether or not the current time is within the communication permitted time in the stationary terminal management table (step S503). For example, in a case where the terminal ID set in the message 1 is "1111," if the current time is 8:30, the communication controller 62 determines that the current time is within the communication permitted time (step S503: Yes); and if the current time is 9:30, the communication controller 62 determines that the current time is not within the communication permitted time (step S503: No).

If it is determined "Yes" in step S503, the communication controller 62 determines whether or not the position indicated by the position information set in the message 1, that is, the current position of the stationary terminal 20 is within the communication permitted area in the stationary terminal management table (step S504).

If the current position of the stationary terminal 20 is within the communication permitted area (step S504: Yes), the communication controller 62 determines whether or not congestion is occurring in the core network 40 (step S505). For example, the communication controller 62 monitors the communication traffic volume in the core network 40, and determines that "congestion is occurring" if the current communication traffic volume in the core network 40 is equal to or larger than a threshold or determines that "congestion is not occurring" if the current communication traffic volume is smaller than the threshold.

If congestion is not occurring in the core network 40 (step S505: Yes), the communication controller 62 determines whether or not the available resource amount set in the message 1, that is, the available resource amount of the radio resources is equal to or larger than a threshold TH1 (step S506).

If the available resource amount set in the message 1 is equal to or larger than the threshold TH1 (step S506: Yes), the communication controller 62 permits connection of the stationary terminal 20 to the server 50 (step S507).

If the current time is not within the communication permitted time (step S503: No), if the current position of the stationary terminal 20 is not within the communication permitted area (step S504: No), if congestion is occurring in the core network 40 (step S505: No), or if the available resource amount set in the message 1 is smaller than the threshold TH1 (step S506: No), the communication controller 62 rejects connection of the stationary terminal 20 to the server 50 (step S508).

If it is determined that the terminal having the terminal ID set in the message 1 is a mobile terminal 10 (step S501: No), the communication controller 62 determines whether or not the communication condition of the terminal having the terminal ID has been recorded in the communication condition management table (step S510).

If the communication condition of the terminal having the terminal ID set in the message 1 has been recorded in the communication condition management table (step S510: Yes), the communication controller 62 reads the communication condition associated with the terminal ID set in the message 1 from the communication condition management table (step S511). When the terminal ID set in the message 1 is "5555," for example, the communication controller 62 reads (x3, y3), (x4, y4), (x5, y5) as time-series position information from the communication condition management table.

Subsequently, the communication controller 62 determines whether or not the mobile terminal 10 has moved on the basis of the read communication condition (step S512). If the position information read in step S511 is (x3, y3), (x4, y4), (x5, y5), for example, the communication controller 62 determines that the mobile terminal 10 has moved (step S512: Yes). If all of multiple position information data within a predetermine period before the current time indicate the same position, for example, the communication controller 62 determines that the mobile terminal 10 has not moved (step S512: No). Since the communication controller 62 determines a mobile terminal 10 that has not moved for a predetermined period to be a stationary terminal, the processing proceeds to step S506 if the determination in step S512 is "No."

If the communication condition of the terminal having the terminal ID set in the message 1 has not been recorded in the communication condition management table (step S510: No) or if the mobile terminal 10 has moved (step S512: Yes), the communication controller 62 permits connection of the stationary terminal 20 to the server 50 (step S507).

After the process in step S507 or step S508, the communication controller 62 generates a message 2, transmits the generated message 2 to the base station 30 (step S509), and terminates the processing. If the communication controller 62 has permitted connection of the stationary terminal 20 to the server 50, the communication controller 62 generates a message 2 in which "permit connection" is set as the "connection result." If the communication controller 62 has rejected connection of the stationary terminal 20 to the server 50, the communication controller 62 generates a message 2 in which "reject connection" is set as the "connection result."

Note that the communication controller 62 may temporarily stop data transmission from the stationary terminal 20 when the determination in step S503, step S504, or step S505 is "No." When the data transmission from the stationary terminal 20 is to be temporarily stopped, the communication controller 62 generates a message 2 in which "interrupt connection" is set as the "connection result." The communication controller 62 may also resume data transmission from the stationary terminal 20 at the point when the determinations in step S503, step S504, and step S505 have become "Yes."

The description refers back to FIG. 7. In the base station 30 in receipt of the message 2 in step S103, the communication controller 34 controls establishment of a wireless link between the stationary terminal 20 and the base station 30 according to the content of the message 2. A case in which the "connection result" in the message 2 is "permit connection" is illustrated in FIG. 7, and thus a radio resource control (RRC) connection is established in step S104. If the "connection result" in the message 2 is "reject connection," the RRC connection is not established and the processing after step S104 is not performed.

After establishment of the RRC connection, the communication controller 24 of the stationary terminal 20 transmits an attachment request to the MME 41 (step S105), and authentication, concealment, and integrity control are performed among the components from the stationary terminal 20 to the S-GW 42 (step S106).

Subsequently, the MME 41 transmits a bearer setting request to the S-GW 42 (step S107), a bearer setting process is performed among the components from the S-GW 42 to the server 50 (step S108), and the S-GW 42 transmits the a bearer setting response to the MME 41 (step S109).

Subsequently, the MME 41 transmits a radio bearer setting request to the base station 30 (step S110), and the communication controller 34 of the base station 30 transmits the radio bearer setting request to the stationary terminal 20 (step S111).

Subsequently, the communication controller 24 of the stationary terminal 20 transmits a radio bearer setting response to the base station 30 (step S112), and the communication controller 34 of the base station 30 transmits the radio bearer setting response to the MME 41 (step S113).

Subsequently, the communication controller 24 of the stationary terminal 20 transmits an attachment completion to the MME 41 (step S114).

Thereafter, the stationary terminal 20 transmits uplink user data packets to the server 50 (step S115).

For transmission of downlink user data packets from the server 50 to the stationary terminal 20 (step S119), a bearer update request is transmitted from the MME 41 to the S-GW 42 (step S116) and a bearer update process is performed among the components from the S-GW 42 to the server 50 (step S117). After the bearer update process, the S-GW 42 transmits a bearer update response to the MME (step S118).

In FIG. 7, note that the wireless link between the stationary terminal 20 and the base station 30 is switched from an idle state to a connected state as a result of the process in step S104. Thus, as a result of the process in step S104, some of all the radio resources in the base station 30 are reserved for the stationary terminal 20.

Furthermore, in FIG. 7, the wired link between the base station 30 and the server 50 is switched from an idle state to a connected state as a result of the process in step S108. Thus, as a result of the process in step S108, some of all the radio resources in the core network 40 are reserved for the stationary terminal 20.

Processing Sequence of Communication System (at Termination of Communication

Figure 11:
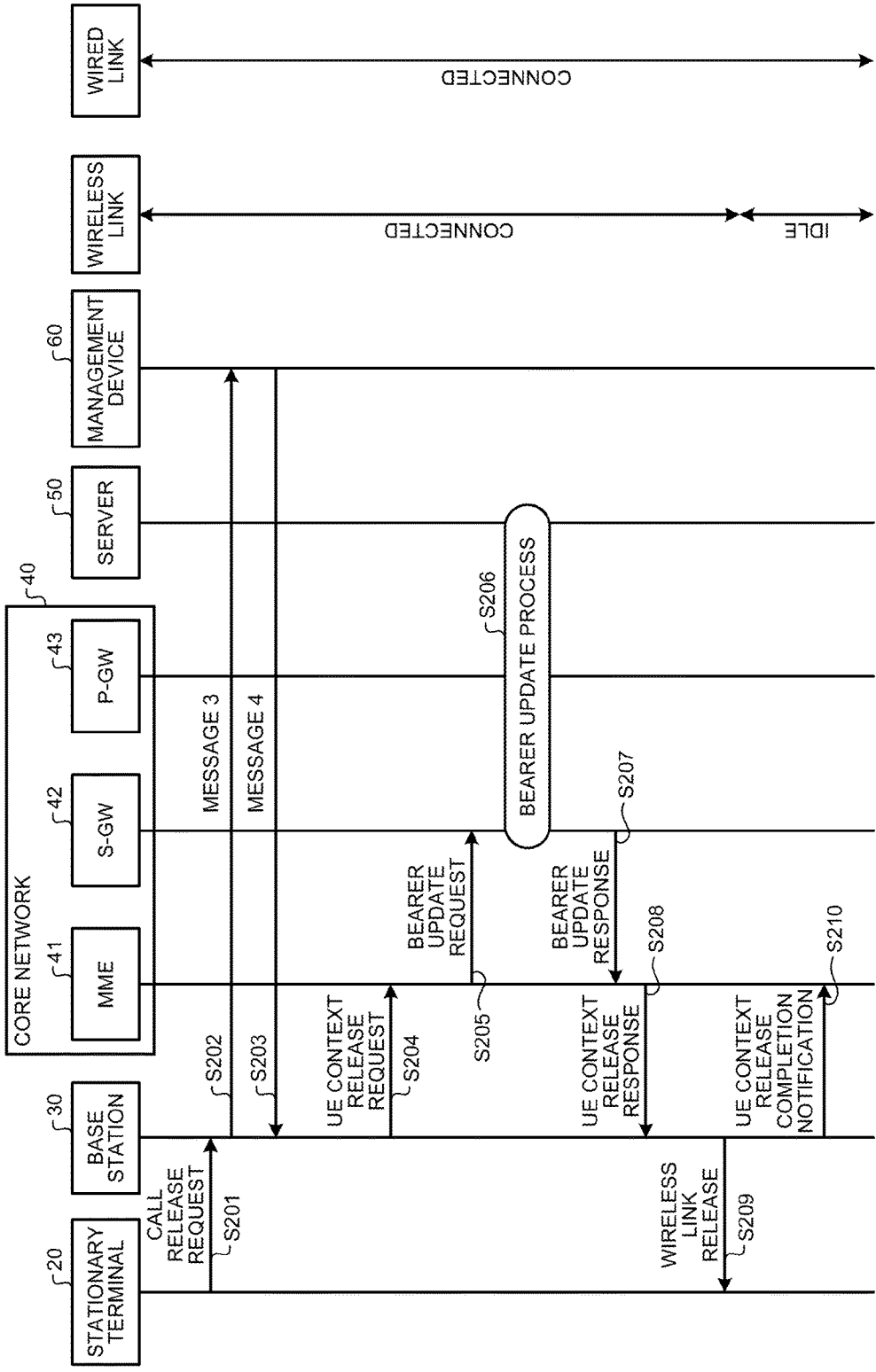
FIG. 11 is a chart illustrating an example of a processing sequence of the communication system according to the first embodiment.
Figure 12:
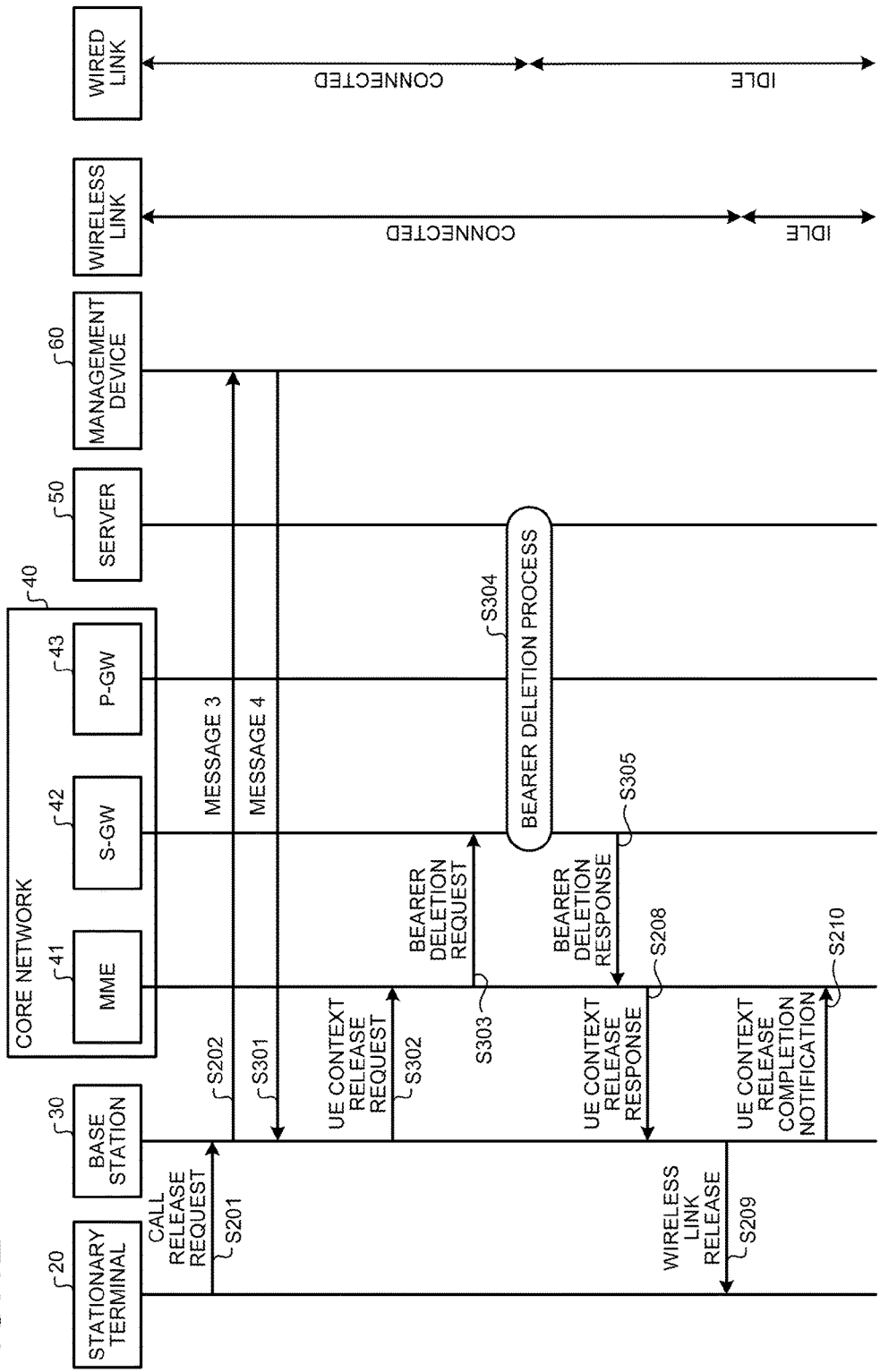
FIG. 12 is a chart illustrating an example of a processing sequence of the communication system according to the first embodiment.

Next, a processing sequence for termination of communication of the stationary terminal 20 will be described. FIGS. 11 and 12 are charts illustrating examples of processing sequences of the communication system according to the first embodiment. FIGS. 11 and 12 illustrate processing sequences of termination of communication of the stationary terminal 20. FIG. 11 illustrates a processing sequence in a case where only radio resources are released among the radio resources and wired resources, and FIG. 12 illustrates a processing sequence in a case where both of the radio resources and the wired resources are released.

Case where Only Radio Resources are Released at Termination of Communication of Stationary Terminal (FIG. 11)

In FIG. 11, the communication controller 24 of the stationary terminal 20 transmits a call release request to the base station 30 (step S201). The call release request contains the terminal ID of the stationary terminal 20.

In the base station 30 in receipt of the call release request, the communication controller 34 generates a "message 3" and transmits the generated message 3 to the management device 60 (step S202).

FIG. 13 is a diagram illustrating an example of the message 3 according to the first embodiment. In FIG. 13, the message 3 contains entries of "terminal ID," "data volume," and "available resource amount," and the contents of the entries are set by the communication controller 34. Specifically, in the "terminal ID," a terminal ID contained in the call release request is set. In the "data volume," the volume of data transmitted and received between the stationary terminal 20 and the server 50 in the current communication is set. In the "available resource amount," information indicating the amount of available resources among all the radio resources in the base station 30 is set. Examples of the information indicating the available resource amount include the number of remaining terminals that can be currently contained in the base station 30, the number of remaining channels that can currently be allocated to terminals, and the remaining transmission power with respect to the total transmission power that the base station 30 is permitted to use.

In the management device 60 in receipt of the message 3, the communication controller 62 determines the connection method at termination of communication of the stationary terminal 20, generates a "message 4" indicating the determination result, and transmits the generated message 4 to the base station 30 (step S203).

Figure 15:
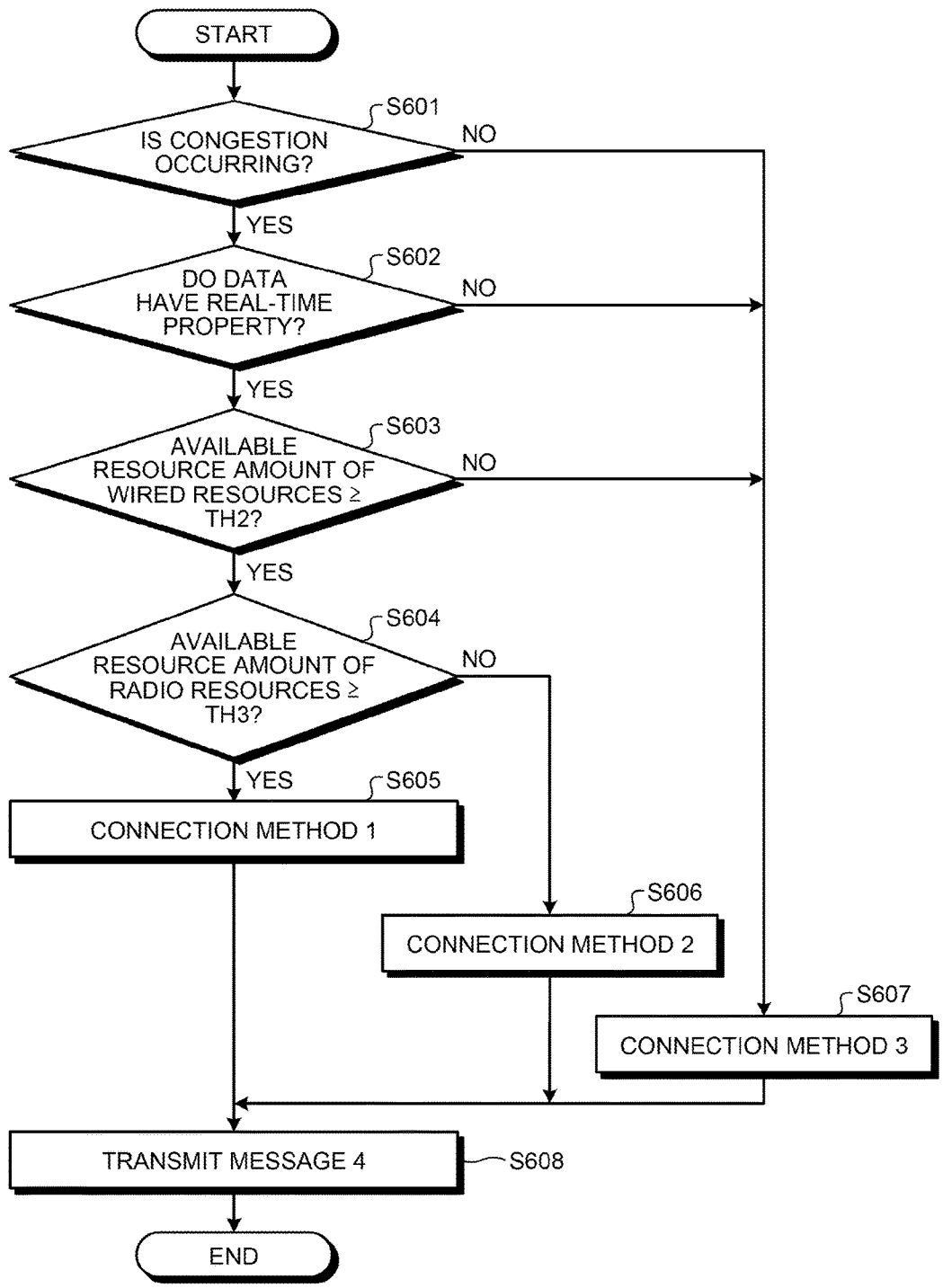
FIG. 15 is a flowchart for explanation of processing performed by the management device according to the first embodiment.

FIG. 14 is a diagram illustrating an example of the message 4 according to the first embodiment. In FIG. 14, the message 4 contains entries of "connection method" and "AO (always on) flag," and the contents of the entries are set by the communication controller 62. In the "connection method," the result of determination on the connection method for the stationary terminal 20 is set. The result of determination on the connection method is either one of two results: "AO connection" and "on-demand connection," for example. The AO flag is set to "0" or "1." The determination on the connection method performed by the communication controller 62 is as follows. FIG. 15 is a flowchart for explanation of processing performed by the management device according to the first embodiment. The flowchart illustrated in FIG. 15 is started when the message 3 is received by the management device 60 and input to the communication controller 62.

In FIG. 15, the communication controller 62 first determines whether or not congestion is occurring in the core network 40 (step S601). For example, the communication controller 62 monitors the communication traffic volume in the core network 40, and determines that "congestion is occurring" if the current communication traffic volume in the core network 40 is equal to or larger than a threshold or determines that "congestion is not occurring" if the current communication traffic volume is smaller than the threshold.

If congestion is not occurring in the core network 40 (step S601: Yes), the communication controller 62 reads management information associated with the terminal ID set in the message 3 from the stationary terminal management table, and determines whether or not data transmitted from the stationary terminal 20 having the terminal ID set in the message 3 have the RT property (step S602).

If the data transmitted from the stationary terminal 20 having the terminal ID set in the message 3 has the RT property (step S602: Yes), the communication controller 62 determines whether or not the available resource amount of the wired resources in the core network 40 is equal to or larger than a threshold TH2 (step S603).

If the available resource amount of the wired resources in the core network 40 is not smaller than the threshold TH2 (step S603: Yes), the communication controller 62 determines whether or not the available resource amount set in the message 3, that is, the available resource amount of the radio resources is equal to or larger than a threshold TH3 (step S604).

If the available resource amount set in the message 3 is not smaller than the threshold TH3 (step S604: Yes), the communication controller 62 determines the connection method for the stationary terminal 20 to be a "connection method 1" (step S605).

if the available resource amount set in the message 3 is smaller than the threshold TH3 (step S604: No), the communication controller 62 determines the connection method for the stationary terminal 20 to be a "connection method 2" (step S606).

If congestion is occurring in the core network 40 (step S601: No), if the data transmitted from the stationary terminal 20 do not have the RT property (step S602: No), or if the available resource amount of the wired resources in the core network 40 is smaller than the threshold TH2 (step S603: No), the communication controller 62 determines the connection method for the stationary terminal 20 to be a "connection method 3" (step S607).

After the process in step S605, step S606, or step S607, the communication controller 62 generates a message 4, transmits the generated message 4 to the base station 30 (step S608), and terminates the processing. If the connection method is determined to be the "connection method 1," the communication controller 62 generates a message 4 in which "always-on connection" is set as the "connection method" and "0" is set as the "AO flag." If the connection method is determined to be the "connection method 2," the communication controller 62 generates a message 4 in which "on-demand connection" is set as the "connection method" and "1" is set as the "AO flag." If the connection method is determined to be the "connection method 3," the communication controller 62 generates a message 4 in which "on-demand connection" is set as the "connection method" and "0" is set as the "AO flag."

Note that the "connection method 1" is a communication method in which connections of both of the wired link and the wireless link are maintained at termination of communication of the stationary terminal 20. Thus, when the connection method 1 is determined, both of the wired resources and the radio resources reserved for the stationary terminal 20 at call setup are not released after termination of communication of the stationary terminal 20.

The "connection method 2" is a communication method in which only the wireless link is released and the connection of the wired link is maintained at termination of communication of the stationary terminal 20. Thus, when the connection method 2 is determined, the radio resources are released with termination of communication of the stationary terminal 20 while the wired resources are not released after termination of communication of the stationary terminal 20 among the wired resources and the radio resources reserved for the stationary terminal 20 at call setup. Thus, when the connection method 2 is determined, only the radio resources are released.

The "connection method 3" is a communication method in which both of the wired link and the wireless link are released at termination of communication of the stationary terminal 20. Thus, when the connection method 3 is determined, both of the wired resources and the radio resources reserved for the stationary terminal 20 at call setup are released with termination of communication of the stationary terminal 20.

FIG. 11 illustrates the processing sequence in the case where only radio resources are released among the radio resources and wired resources at termination of communication of the stationary terminal 20, and thus corresponds to a processing sequence in a case where the "connection method 2" is determined as the connection method at termination of communication of the stationary terminal 20.

The description refers back to FIG. 11. In the base station 30 in receipt of the message 4 in step S203, the communication controller 34 transmits a UE context release request to the MME 41 according to the content of the message 4 (step S204).

Subsequently, the MME 41 transmits a bearer update request to the S-GW 42 (step S205), and a bearer update process is performed among the components from the S-GW 42 to the server 50 (step S206). After the bearer update process, the S-GW 42 transmits a bearer update response to the MME 41 (step S207).

The MME 41 in receipt of the bearer update response transmits a UE context release response to the base station 30 (step S208), and the communication controller 34 of the base station 30 notifies the stationary terminal 20 of the release of the wireless link (step S209). The communication controller 34 also transmits a UE context release completion notification to the MME 41 (step S210).

In FIG. 11, note that the wireless link between the stationary terminal 20 and the base station 30 is switched from a connected state to an idle state as a result of the process in step S209. Thus, the radio resources reserved for the stationary terminal 20 are released as a result of the process in step S209.

Case where both radio resources and wired resources are released at termination of communication of stationary terminal (FIG. 12)

Since the processes in steps S201, S202, S208 to S210 in FIG. 12 are the same as those in FIG. 11, the description thereof will not be repeated.

FIG. 12 illustrates the processing sequence in the case where both of the radio resources and the wired resources are released at termination of communication of the stationary terminal 20, and thus corresponds to a processing sequence in a case where the "connection method 3" is determined as the connection method at termination of communication of the stationary terminal 20. Thus, in step S301 in FIG. 12, the communication controller 62 of the management device 60 transmits a message 4 in which "on-demand connection" is set as the "connection method" and "0" is set as the "AO flag" to the base station 30.

In the base station 30 in receipt of the message 4 in step S301, the communication controller 34 transmits a UE context release request to the MME 41 according to the content of the message 4 (step S302).

Subsequently, the MME 41 transmits a bearer deletion request to the S-GW 42 (step S303), and a bearer deletion process is performed among the components from the S-GW 42 to the server 50 (step S304). After the bearer deletion process, the S-GW 42 transmits a bearer deletion response to the MME 41 (step S305).

In FIG. 12, note that the wireless link between the stationary terminal 20 and the base station 30 is switched from a connected state to an idle state as a result of the process in step S209. Thus, the radio resources reserved for the stationary terminal 20 are released as a result of the process in step S209.

Furthermore, in FIG. 12, the wired link between the base station 30 and the server 50 is switched from a connected state to an idle state as a result of the process in step S304. Thus, the wired resources reserved for the stationary terminal 20 are released as a result of the process in step S304.

Processing of Base Station

Figure 16:
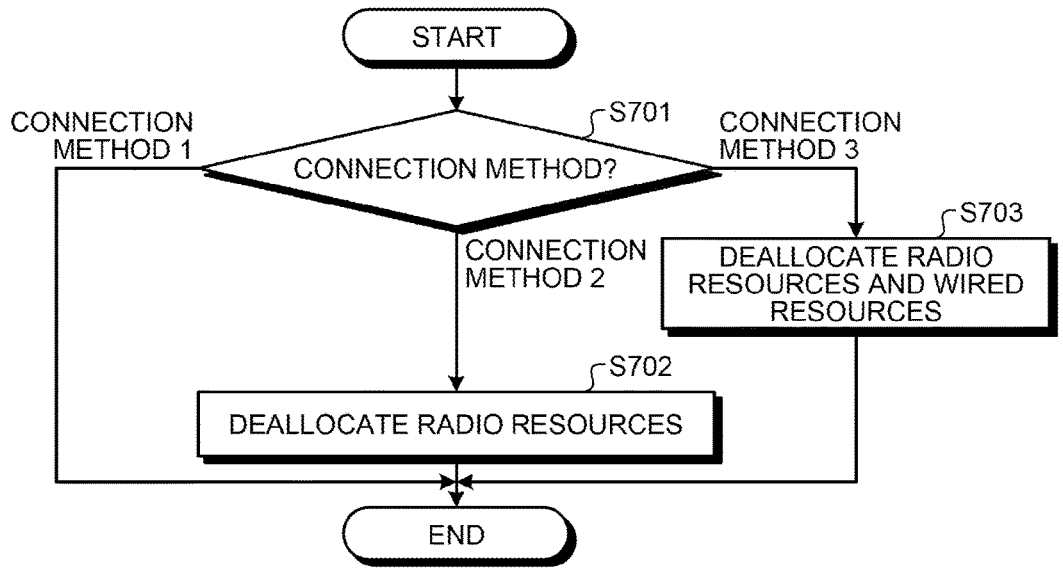
FIG. 16 is a flowchart for explanation of processing performed by the base station according to the first embodiment.

FIG. 16 is a flowchart for explanation of processing performed by the base station according to the first embodiment. The flowchart illustrated in FIG. 16 is started when the message 4 is received by the base station 30 and input to the communication controller 34.

In FIG. 16, the communication controller 34 first determines the connection method at termination of communication of the stationary terminal 20 on the basis of the content of the message 4 (step S701). Specifically, if "always-on connection" is set as the "connection method" and "0" is set as the "AO flag" in the message 4, the communication controller 34 determines that the connection method at termination of communication of the stationary terminal 20 is the "connection method 1." If "on-demand connection" is set as the "connection method" and "1" is set as the "AO flag" in the message 4, the communication controller 34 determines that the connection method at termination of communication of the stationary terminal 20 is the "connection method 2." If "on-demand connection" is set as the "connection method" and "0" is set as the "AO flag" in the message 4, the communication controller 34 determines that the connection method at termination of communication of the stationary terminal 20 is the "connection method 3."

If the determination result in step S701 is the "connection method 1" (step S701: connection method 1), the communication controller 34 maintains both of the wired resources and the radio resources reserved for the stationary terminal 20 at call setup without releasing the resources, and terminates the processing.

If the determination result in step S701 is the "connection method 2" (step S701: connection method 2), the communication controller 34 releases the radio resources and maintains the wired resources without releasing the wired resources among the wired resources and the radio resources reserved for the stationary terminal 20 at call setup (step S702). The release of the radio resources is performed by the process of step S209 in FIG. 11.

If the determination result in step S701 is the "connection method 3" (step S701: connection method 3), the communication controller 34 releases both of the wired resources and the radio resources reserved for the stationary terminal 20 at call setup, and terminates the processing (step S703). The release of the radio resources is performed by the process of step S209 in FIG. 12 and the release of the wired resources is performed by the process of step S304 in FIG. 12.

As described above, in the first embodiment, the management device 60 includes the communication controller 62 and the network interface unit 61. The communication controller 62 determines whether or not to release communication resources reserved for the stationary terminal 20 on the basis of whether or not congestion is occurring in the core network 40 at termination of communication of the stationary terminal 20. The network interface unit 61 transmits the determination result of the communication controller 62 to the base station 30.

In this manner, if congestion is occurring in the core network 40, the communication resources reserved for the stationary terminal 20 that has terminated communication can be released and made available for a mobile terminal 10. This can thus allow efficient use of communication resources.

Furthermore, in the first embodiment, the communication controller 62 further determines whether or not to release some of the communication resources reserved for the stationary terminal 20 on the basis of whether or not data transmitted from the stationary terminal 20 to the server 50 have the RT property.

In this manner, it is possible to efficiently use communication resources without inhibiting transmission of data having the RT property.

Furthermore, in the first embodiment, the communication controller 62 further determines whether or not to release some of the communication resources reserved for the stationary terminal 20 on the basis of the available resource amount of the communication resources.

In this manner, it is possible to maintain some of the communication resources reserved for the stationary terminal 20 without releasing the communication resources when the available resource amount is large, and it is therefore possible to prevent wasteful release of communication resources.

[b] Other Embodiments

Figure 17:
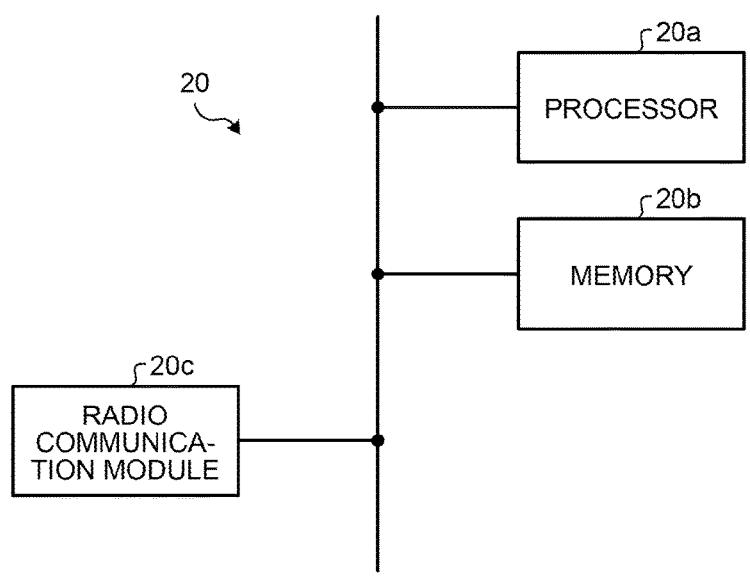
FIG. 17 is a diagram illustrating an example hardware configuration of the stationary terminal.

[1] The stationary terminal 20 can be achieved by a hardware configuration as follows. FIG. 17 is a diagram illustrating an example hardware configuration of the stationary terminal. As illustrated in FIG. 17, the stationary terminal 20 includes a processor 20*a*, a memory 20*b*, and a radio communication module 20*c* as hardware components. Examples of the processor 20*a* include a central processing unit (CPU), a digital signal processor (DSP), and a field programmable gate array (FPGA). The stationary terminal 20 may include a large scale integrated circuit (LSI) including the processor 20*a* and peripheral circuits. Examples of the memory 20*b* include a RAM such s a SDRAM, a ROM, and a flash memory.

The antenna 21 and the radio communication unit 22 are achieved by the radio communication module 20*c*. The BB processor 23 and the communication controller 24 are achieved by the processor 20*a*.

Figure 18:
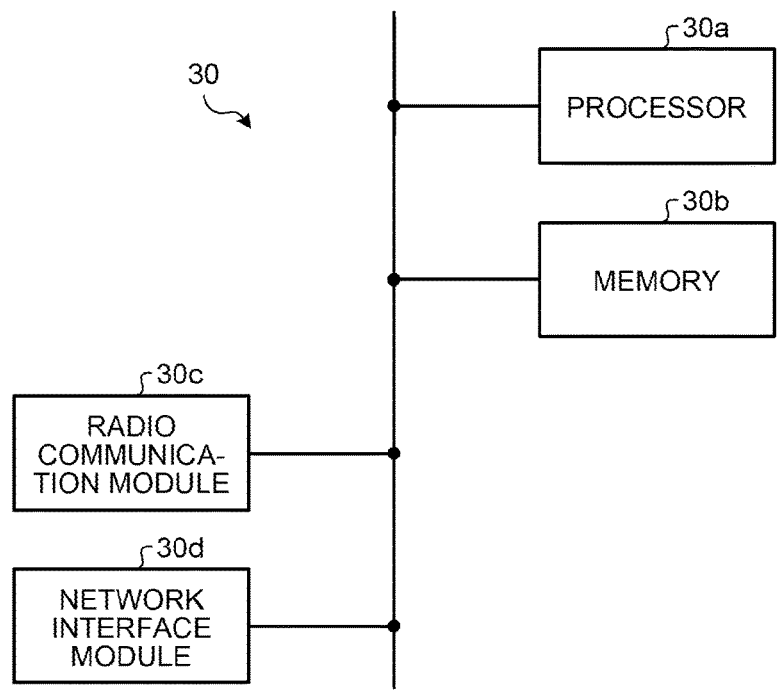
FIG. 18 is a diagram illustrating an example hardware configuration of the base station.

[2] The base station 30 can be achieved by a hardware configuration as follows. FIG. 18 is a diagram illustrating an example hardware configuration of the base station. As illustrated in FIG. 18, the base station 30 includes a processor 30*a*, a memory 30*b*, a radio communication module 30*c*, and a network interface module 30*d* as hardware components. Examples of the processor 30*a* include a CPU, a DSP, and a FPGA. The base station 30 may include a LSI including the processor 30*a* and peripheral circuits. Examples of the memory 30*b* include a RAM such s a SDRAM, a ROM, and a flash memory.

The antenna 31 and the radio communication unit 32 are achieved by the radio communication module 30*c*. The BB processor 33 and the communication controller 34 are achieved by the processor 30a. The network interface unit 35 is achieved by the network interface module 30d.

Figure 19:
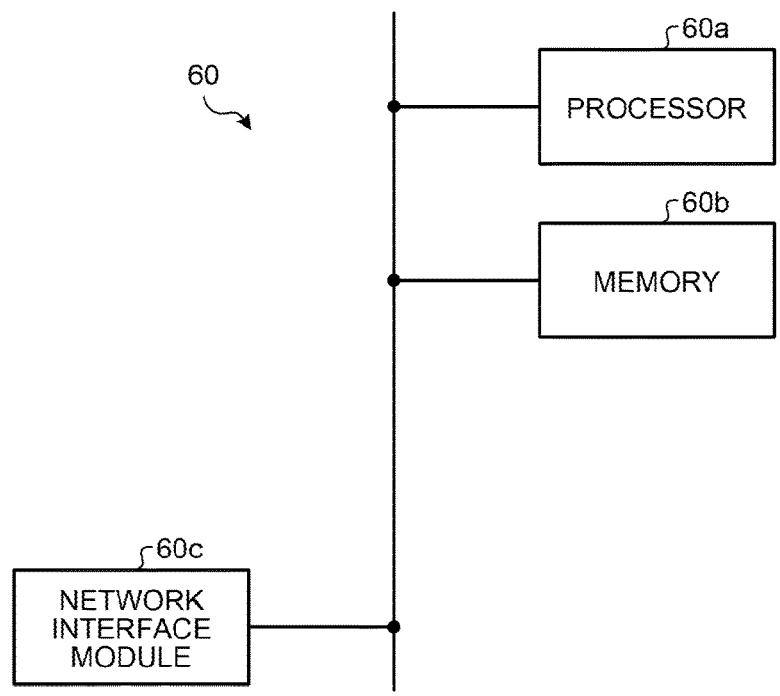
FIG. 19 is a diagram illustrating an example hardware configuration of the management device.

[3] The management device 60 can be achieved by a hardware configuration as follows. FIG. 19 is a diagram illustrating an example hardware configuration of the management device. As illustrated in FIG. 19, the management device 60 includes a processor 60a, a memory 60b, and a network interface module 60c as hardware components. Examples of the processor 60a include a CPU, a DSP, and a FPGA. The management device 60 may include a LSI including the processor 60a and peripheral circuits. Examples of the memory 60b include a RAM such s a SDRAM, a ROM, and a flash memory.

The network interface unit 61 is achieved by the network interface module 60c. The communication controller 62 is achieved by the processor 60a. The information storage unit 63 is achieved by the memory 60b.

According to an aspect of the disclosure, communication resources can be effectively used.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A management device comprising:
   a communication controller that
      determines whether a user equipment indicated by a message received from a base station is a mobile terminal or a stationary terminal, and
      when the communication controller determines that the user equipment is the stationary terminal, at termination of communication between the stationary terminal and the base station, determines connection method for the stationary terminal based on presence or absence of congestion in a core network, presence or absence of real-time property in data transmitted from the stationary terminal, a first available resource amount of a wired resource in the core network and a second available resource amount of a radio resource, the communication being terminated by the base station according to a request from the stationary terminal to the base station; and
   a network interface unit that transmits a result of the determination by the communication controller to a base station.

2. The management device according to claim 1, wherein the connection method includes a first connection method, a second connection method and a third connection method, the first connection method being a connection method in which both of a wired link and a wireless link are maintained at termination of the communication, the second connection method being a connection method in which the wireless link is released and the wired link is maintained at termination of the communication, the third connection method being a connection method in which both of the wired link and the wireless link are released at termination of the communication, and
the communication controller determines the connection method as one of the first connection method, the second connection method and the third connection method.

3. The management device according to claim 2, wherein the communication controller:
   determines the connection method as the third connection method when the congestion is presence, the real-time property is absence, or the first available resource amount is smaller than a first threshold,
   determines the connection method as the second connection method when the second available resource amount is smaller than a second threshold, and
   determines the connection method as the first connection method when the congestion is absence, the real-time property is presence, the first available resource amount is not smaller than the first threshold and the second available resource amount is not smaller than the second threshold.

4. A communication system comprising: a stationary terminal; a base station; a core network; and a management device, wherein
   the management device
      determines whether a user equipment indicated by a message received from a base station is a mobile terminal or a stationary terminal,
      when the management device determines that the user equipment is the stationary terminal, at termination of communication between the stationary terminal and the base station, determines connection method for the stationary terminal based on presence or absence of congestion in the core network, presence or absence of real-time property in data transmitted from the stationary terminal, a first available resource amount of a wired resource in the core network and a second available resource amount of a radio resource, the communication being terminated by the base station according to a request from the stationary terminal to the base station, and
      transmits a result of the determination to the base station.

5. A communication control method comprising:
   determining whether a user equipment indicated by a message received from a base station is a mobile terminal or a stationary terminal; and
   when determining that the user equipment is the stationary terminal, at termination of communication between the stationary terminal and the base station, determining connection method for the stationary terminal based on presence or absence of congestion in a core network, presence or absence of real-time property in data transmitted from the stationary terminal, a first available resource amount of a wired resource in the core network and a second available resource amount of a radio resource, the communication being terminated by the base station according to a request from the stationary terminal to the base station.

* * * * *